United States Patent [19]

Inagaki et al.

[11] Patent Number: 4,604,560

[45] Date of Patent: Aug. 5, 1986

[54] NUMERICAL CONTROL MACHINE TOOL WITH AN EMERGENCY ORIGIN RETURNING FUNCTION

[75] Inventors: Syoji Inagaki, Kariya; Hideyuki Sanpe, Toyota; Norimitsu Makihara, Gamagouri, all of Japan

[73] Assignee: Toyoda Koki Kabushiki Kaisha, Kariya, Japan

[21] Appl. No.: 537,446

[22] Filed: Sep. 30, 1983

[30] Foreign Application Priority Data

Oct. 13, 1982 [JP] Japan .................. 57-179218

[51] Int. Cl.$^4$ .............................. G05B 19/10
[52] U.S. Cl. .................... 318/567; 318/563; 318/396; 318/626; 364/474
[58] Field of Search ........... 318/563, 567, 568, 626, 318/566, 565, 590, 592, 594, 603, 601, 602, 286, 462, 396; 364/474, 475, 167, 171, 550, 513

[56] References Cited

U.S. PATENT DOCUMENTS

| | | | |
|---|---|---|---|
| 3,512,060 | 5/1970 | Floyd | 318/603 |
| 3,889,105 | 6/1975 | Schneekloth | 318/568 X |
| 4,315,200 | 2/1982 | Yamada | 318/603 |
| 4,398,136 | 8/1983 | Tanaka | 318/561 |
| 4,398,837 | 8/1983 | Torii | 318/565 X |
| 4,426,763 | 1/1984 | Hornok | 318/602 X |
| 4,442,493 | 4/1984 | Wakai | 364/474 X |
| 4,446,408 | 5/1984 | Ebermann | 318/565 X |
| 4,481,568 | 11/1984 | Inaba | 318/568 X |
| 4,482,968 | 11/1984 | Inaba | 318/568 X |
| 4,489,377 | 12/1984 | Mawyer | 364/167 |
| 4,497,029 | 1/1985 | Kiyokawa | 318/563 X |
| 4,513,380 | 4/1985 | Spooner | 364/474 |

Primary Examiner—William M. Shoop, Jr.
Assistant Examiner—Patrick C. Keane
Attorney, Agent, or Firm—Oblon, Fisher, Spivak, McClelland & Maier

[57] ABSTRACT

In a numerical control system, a machine tool with an automatic tool changer is provided with an origin detector for generating an origin signal when an NC drive axis for effecting relative movement between a spindle head and a work table in an axial direction of a tool spindle is returned to a machine origin. A numerical controller is connected to the NC dirve axis, the tool changer and when operated in accordance with a numerical control program, controls them so that a series of machinings can be selectively performed on a workpiece on the work table. The numerical controller executes an emergency returning control program when a manual switch is depressed to instruct the returning of the NC drive axis to the machine origin. The numerical controller, when operated in accordance with the returning control program, controls the NC drive axis to discontinue advance movement and then to effect retraction movement and further controls the drive motor to rotate in a selected direction during the retraction movement. The selection of the rotational direction is made by reference to a memory device for storing data indicative of a tool being presently used on the tool spindle. The numerical controller further controls the tool changer in accordance with the returning control program, whereby a tool which is scheduled by the numerical control program to be used firstly, can be set up on the tool spindle to make the system ready for the subsequent restarting.

3 Claims, 5 Drawing Figures

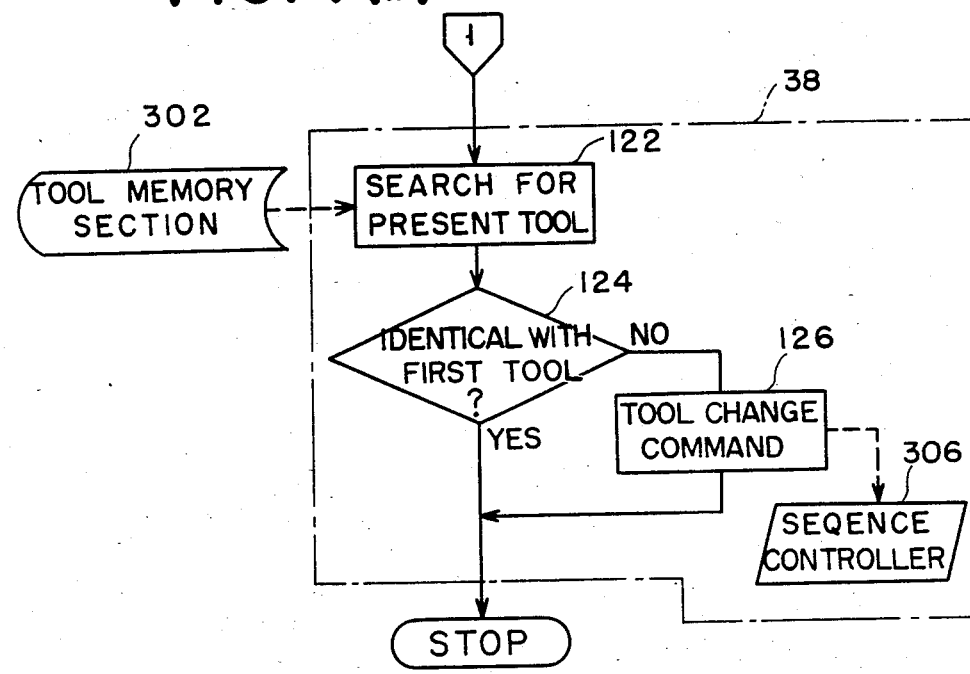

1

NUMERICAL CONTROL MACHINE TOOL WITH AN EMERGENCY ORIGIN RETURNING FUNCTION

BACKGROUND OF THE INVENTION

1. Field of the Invention

The present invention relates in general to a numerical control system for a machine too, and particularly to a numerical control machine tool capable of immediately returning an NC drive axis to a machine origin in case of emergency.

2. Description of the Prior Art

A dangerous or abnormal situation often happens when a numerical control machine tool is controlled in accordance with a numerical control program. In order to obviate such a dangerous or abnormal situation, an emergency stop button is depressed by an operator to discontinue the operation of the machine tool immediately. In this emergency stop state, each of NC (numerical control) drive axes of the machine tool is usually away from a machine origin thereof, in which state it is impossible to restart the machine tool in accordance with the numerical control program. More importantly, the emergency stop button, when depressed, breaks power supply to every circuit component of the system, and data which is stored in the numerical controller to represent feed amounts of the NC drive axes from respective machine origins is lost in the event of the emergency stop. This makes it impossible to return each of the NC drive axes to the machine origin thereof in an automatic mode in response to the depression of the emergency stop button.

In a prior art numerical control machine tool system, in order to set the system for a subsequent restarting, the operational mode of a numerical controller used therein is manually changed from an automatic continuous mode to a jog mode. The states of NC drive axes are confirmed by an operator, and individual manipulations depending upon the confirmed states of the NC drive axes are performed to return the NC drive axes to respective machine origins through jog feeds. Otherwise, where the states of the NC drive axes permit, an automatic origin returning command is manually input and is executed by the numerical controller thereby to automatically return the NC drive axes to the respective machine origins.

In a flexible transfer machine including a plurality of numerical control machine tools connected in series by a transfer device, when an emergency stop is effected, the states of every machine tool must be confirmed and various manipulations appropriate to each of the confirmed states must be performed to return NC drive axes of each machine tool to respective machine origins. The restarting of the transfer machine in an automatic continuous mode is impossible without operator's such various manipulations. For this reason, a long period of time is spent from the occurrence of an emergency stop until the restarting of the transfer machine in the automatic continuous mode, and the operator is required to do complicated manipulations for the machine tools. That is, the discontinuation by an emergency stop of a numerical control operation needs operator's laborious works and a long period of time for restarting of the operation.

SUMMARY OF THE INVENTION

In light of the above, applicants of the subject application have invented an apparatus for discontinuing an numerical control operation immediately at the occurrence of a dangerous or abnormal situation and for automatically returning NC drive axes of a machine tool to respective machine origins.

That is, the applicants became aware that such an abnormal state, without effecting an emergency stop, can be obviated by discontinuing the infeed movement of a tool immediately at the occurrence of the abnormal state and then by moving the tool in a direction in which no abnormality is encountered, namely in such a direction as to go away from the workpiece. The applicants further became aware that the restarting of an automatic continuous operation in accordance with a numerical control program can be easily possible by returnig the tool to a machine origin thereof in advance.

In a known flexible transfer machine of the type wherein a plurality of numerical control machine tools are connected by a transfer device, there may be included a numerical control machine tool which is capable of performing automatic tool change with respect to several kinds of tools. Accordingly, in such a numerical control machine tool, one of tool returning cycles must be selected depending upon the kind of a tool which is being mounted on a tool spindle at the time of occurrence of an emergency stop. For example, in the case of a drilling, a spindle head can be retracted away from a work table, with a tool spindle rotating in a positive-going direction. However, in the case of a tapping, the spindle head must be retracted with the tool spindle rotating in an opposite or negative-going direction. It is therefore necessary to identify the kind of a tool being received in the tool spindle at the occurrence of an emergency stop and to select one of returning cycles depending upon the result of such tool identification.

Additionally, it is desirable to restart the automatic continuous operation in accordance with the numerical control program immediately after the cause of a danger or abnormality is eliminated. To this end, the tool which is scheduled by the numerical control program to be used firstly must be set up on the tool spindle after the NC drives axes are returned to the respective machine origins.

Accordingly, it is a primary object of the present invention to provide an improved numerical control machine tool capable of discontinuing a numerical control machining operation in response to an emergency origin returning command so as to return an NC drive axis to a machine origin while rotating a tool spindle in one of directions suitable to a tool being received in the tool spindle.

Another object of the present invention is to provide an improved numerical control machine tool which is capable of not only immediately returning an NC drive axis to a machine origin when an emergency origin returning is instructed, but also automatically setting up on a tool spindle the tool which is scheduled by a numerical control program to be used firstly, so that the restarting of a series of machinings according to the numerical control program can be restarted immediately after the cause of a danger or abnormality is eliminated.

Briefly, according to the present invention, there is provided a numerical control machine tool comprising an NC drive axis for effecting relative movement between a spindle head and a work table and a tool changer for selectively attaching onto a tool spindle rotatable on the spindle head one of tools being stored in a tool magazine. A numerical controller is connected to the NC drive axis, the tool changer and a drive device connected to the tool spindle and when operated in accordance with a numerical control program, controls them to perform a series of machinings on a workpiece on the work table. The numerical controller is connected with an origin detector to receive an origin signal therefrom when the NC drive axis is returned to the machine origin. A memory device is provided for storing data indicative of a tool being presently used on the tool spindle. The numerical controller includes an origin returning control device and a rotation control device. When a command device is manually operated to input to the numerical controller a signal instructing the returning of the NC drive axis to the machine origin, the origin returning control device controls the NC drive axis to discontinue advance movement and then to effect retraction movement until the origin signal is output from the origin detector. The rotation control device determines the rotational direction of the tool spindle by reference to the data in the memory device and during the retraction movment to the machine origin, controls the drive device to rotate in the determined rotational direction.

With this configuration, data indicative of the tool being received in the tool spindle when the return command is given is stored in the memory device, and during the retraction movement to the machine origin, the tool spindle is rotated in such a direction as to be determined by reference to the data being stored in the memory device. This makes it possible to return the NC drive axis to the machine origin in one of different modes which depends upon the tool being received in the tool spindle when the emergency returning is instructed. Accordingly, emergency returning of an NC drive axis to a machine origin can be realized in a machine tool of the type having an automatic tool changer.

In another aspect of the present invention, the numerical controller further includes a tool set-up control device which is operated when the NC drive axis is returned to the machine origin under the control of the origin returning control device. The set-up control device, when operated, controls the tool changer to set up on the tool spindle the tool which is scheduled by the numerical control program to be used firstly. Thus, when the cause of a danger or abnormality is eliminated thereafter, it is possible to restart the machine tool immediately in accordance with the numerical control program. Particularly, the numerical control machine tool according to the present invention is advantageous when applied as each of those machine tools which are connected by a transfer device to constitute a flexible transfer machine.

BRIEF DESCRIPTION OF THE ACCOMPANYING DRAWINGS

The foregoing and other objects and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout the several views, and in which:

FIGS. 4(a) and 4(b) are flow charts of an automatic origin returning routine executed by a central processing unit of a numerical controller provided in the system.

DETAILED DESCRIPTION OF A PREFERRED EMBODIMENT

Figure 1:
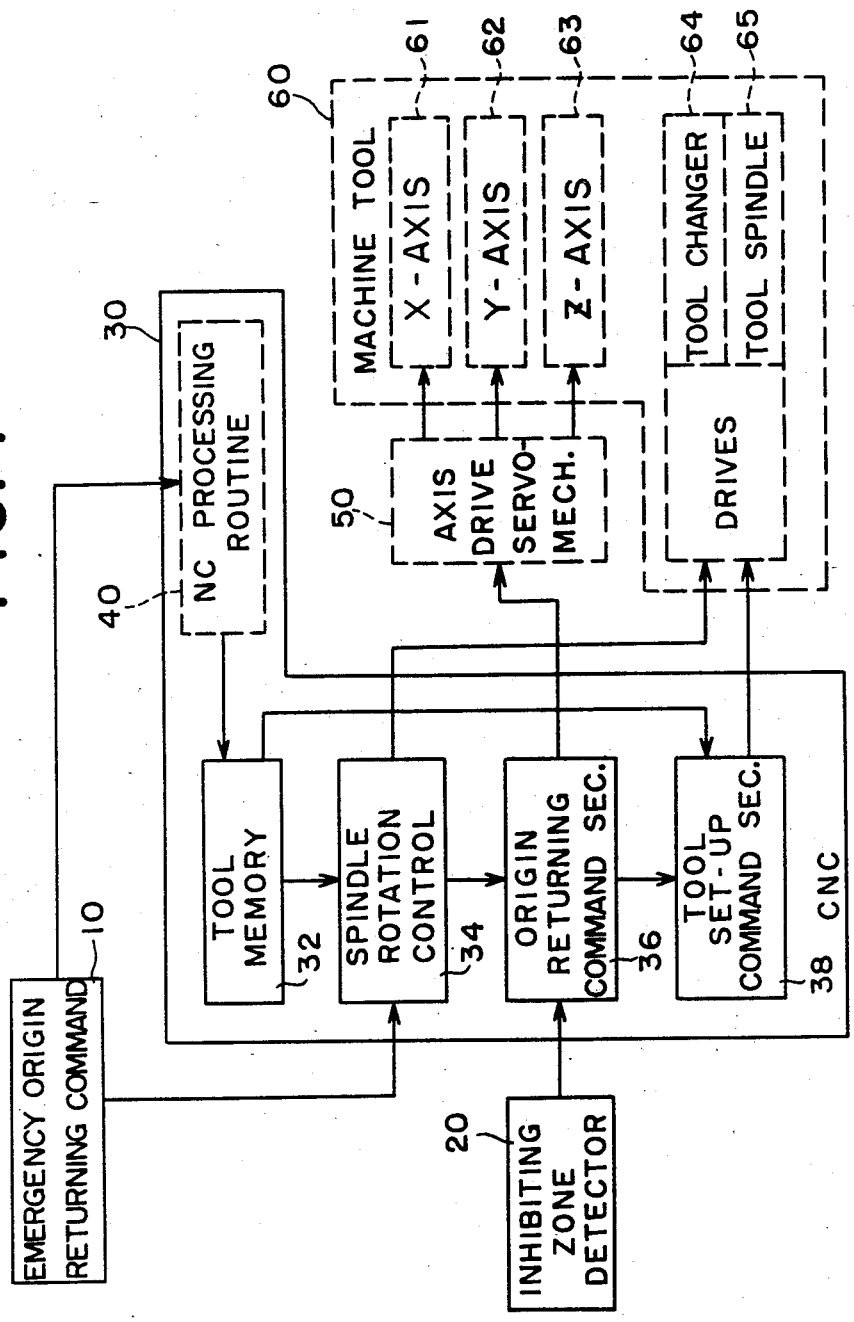
FIG. 1 is a block diagram illustrative of conceptual elements which constitute a numerical control machine tool with an emergency origin returning function according to the present invention.

Referring now to FIG. 1, the concept of the present invention is described in the form of a block diagram. Blocks of solid lines show components essential to the present invention, whereas blocks of broken lines show components ordinary to a numerical control machine tool. Herein, an emergency origin returning command means 10 is constructed by a signal generator which is operable by an operator for inputting an origin returning command to a numerical controller 30. Upon receiving the returning command as an interrupt, the numerical controller 30 discontinues the execution of an NC processing routine 40 and instead, executes an emergency origin returning routine characterizing the present invention.

A tool memory section 32 stores data indicative of a tool which has been mounted on a tool spindle 65 in the event that the origin returning command is input. The storing of such data is done based upon tool data included in plural blocks of a numerical control program (not shown) which is executed under control of the NC processing routine 40. A spindle rotational control section 34 operates in response to the origin returning command. The section 34, when so operated, identifies the tool being used in a present machining operation, by reference to data being stored in the tool memory section 32 and controls the tool spindle 65 to rotate in a direction suitable for retraction feed of the tool.

For the purpose of precisely returning each NC drive axis to a machine origin therefor, an origin return inhibiting zone is defined near the machine origin. The variation in the timing at which a movable head is stopped must be prevented although it depends upon the inertia of the movable head. To this end, it is necessary to decelerate the feed speed of the movable head to a predetermined low speed in a predetermined time after a deceleration point detector disposed in the vicinity of the machine origin is actuated by the movable head. It is also necessary to cause the movable head to come to the machine origin at the predetermined low speed and to discontinue the operation of the NC drive axis in response to a signal which is generated from an origin detector when the movable head reaches the machine origin. In addition, in order to eliminate position errors caused by a feed screw-nut backlash, it is required to return the movable head to the machine origin from one direction.

In order to realize the precise returning of each NC drive axis to a machine origin therefor in the aforementioned manner, the origin return inhibiting zone is set. When the origin returning command is generated in case of emergency, with an NC drive axis being located within the origin return inhibiting zone, the NC drive axis is operated in an opposite direction, i.e., in such a direction as to go away from the machine origin. Thus, the NC drive axis is once moved out of the origin return inhibiting zone and then is moved to the machine origin at the predetermined low speed. For this purpose, a detector 20 for detecting the origin return inhibiting zone is provided for each NC drive axis. A detection signal from the detector 20 is input to an origin returning command section 36 of the numerical controller 30. The command section 36 is operable in one of first and second returning control modes selected based upon the detection signal and controls the returning of each NC drive axis to a machine origin therefor in a selected one of the first and second returning control modes.

A tool set-up command section 38 is operated after all of the NC drive axes are returned to their machine origins. The section 38, when operated, selects a tool used in a first step of a numerical control machining operation, by reference to data being stored in the tool memory section 32 and instructs the attaching of the selected tool to the tool spindle 65.

A series of processings for an emergency origin returning operation are performed as described above, whereby the state of the numerical control machine tool 60 is restored to the state in which the restarting of the machine tool 60 is possible.

Figure 2:
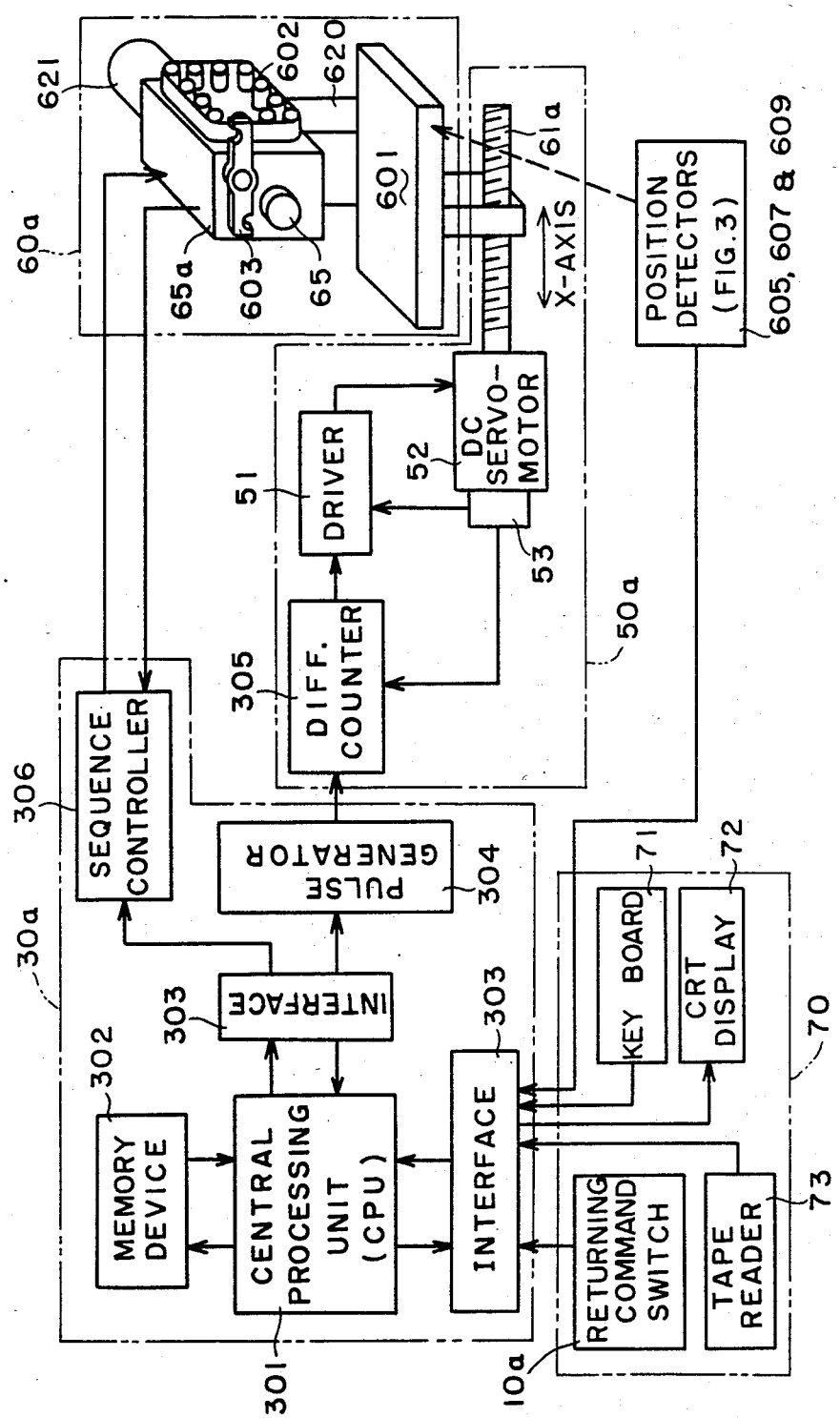
FIG. 2 is a block diagram showing an embodiment of the machine tool.

An embodiment of the present invention will be described hereafter in detail. Referring now to the drawings and particularly to FIG. 2, a numerical control machine tool according to the present invention is shown comprising a numerical controller 30a, a manipulation panel 70 for inputting various commands thereto, an NC drive axis 50a and a machine tool 60a. The numerical controller 30a includes a memory device 302, a central processing unit (hereafter "CPU") 301, interface circuits 303 and a pulse generator 304. The memory device 302 stores predetermined system control programs and various data. The CPU 301 exchanges signals or data with the memory device 302 and decodes commands or data to generate corresponding signals. The interface circuits 303 permit the exchanges of signals between the CPU 301 and peripheral input and output devices. The pulse generator 304 generates feed pulses for driving the NC drive axis 50a of the machine tool 60a.

The manipulation pannel 70 is constructed by a key board 71, a paper tape reader 73, a CRT display 72 and an emergency origin returning command switch 10a. The key board 71 is manually operable for inputting various instructions and signals to the CPU 301. The tape reader 73, when operated, reads information or date on a paper tape for storage in the memory device 302. The CRT display 72 displays information processed by the CPU 301 for visual recognition by an operator. The switch 10a constitutes an essential part of the present invention and when depressed, generates a command signal for instructing that the NC drive axis 50a of the machine tool 60a be returned to a machine origin therefor.

The NC drive axis 50a includes a differential counter 305 and a driver 51 responsive to the content of the differential counter 305 for generating a DC voltage proportional to the content. The differential counter 305 is connected to the pulse generator 304 to receive therefrom feed pulses as a servodrive objective value. A DC servomotor 52 is connected to the driver 51 to receive the DC voltage therefrom and is rotatable at a speed corresponding to the DC voltage for driving a feed screw 61a. For rotational position and speed controls of the feed screw 61a, the servomotor 52 has incorporated therein a resolver 53, from which position and speed feedback signals are respectively applied to the differential counter 305 and the driver 51.

The machine tool 60a is constructed by a machine frame 620, a spindle head 65a rotatably supporting a tool spindle 65, a tool magazine 602, a tool exchanger 603, and a work table 601 for supporting a workpiece, not shown. The machine tool 60a is generally known as a machining center, wherein the exchanger 603 exchanges tools between the tool spindle 65 and the tool magazine 602 for permitting successive executions of a series of programmed machining operations. The work table 601 is movable by the screw shaft 61a in an axial direction of the tool spindle 65. Although the machine tool 60a is illustrated having only the NC drive axis 50a for X-direction feed, it further includes NC drive axes (not shown in FIG. 2) for Y and Z-direction feeds each having the same configuration as the X-direction NC drive axis 50a.

Figure 3:
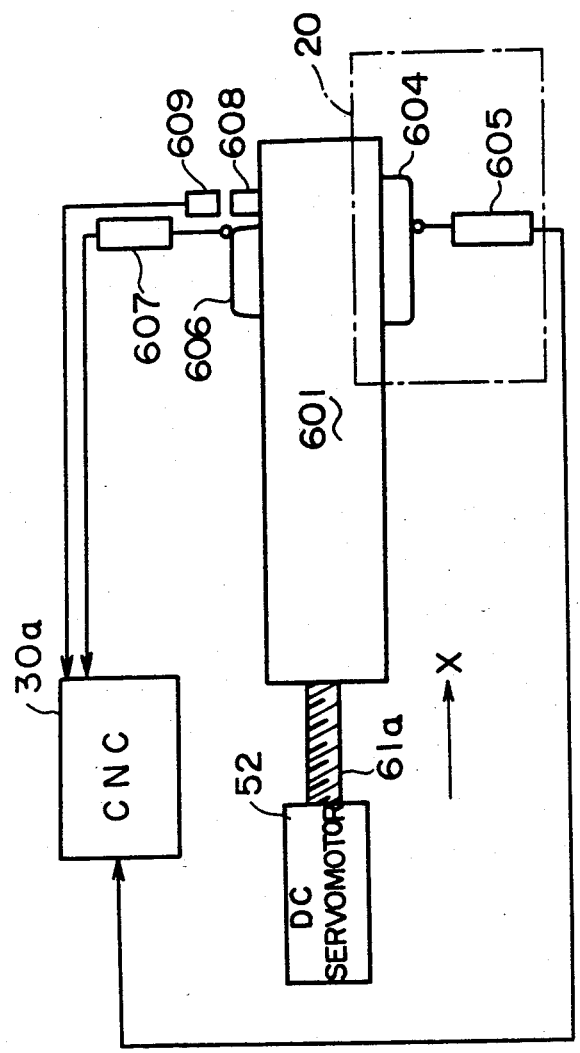
FIG. 3 is an explanatory view showing a detector for an origin return inhibiting zone along with other detectors used for controlling an origin returning operation.

As shown in FIG. 3, the work table 601 movable by the feed screw 61a has secured thereto a dog plate 604 for defining an origin return inhibiting zone. A limit switch 605 is fixedly provided for engagement with the dog plate 604. Further, another limit switch 607 is engageable with another dog plate 606 for defining a deceleration zone, and an origin detector composed of a pair of photocouplers 608 and 609 is provided for detecting the returning of the work table 601 to the machine origin. The detectors 605, 607 and 609 are connected to the numerical controller 30a for applying their detection signals to the numerical controller 30a.

Figure 4A:
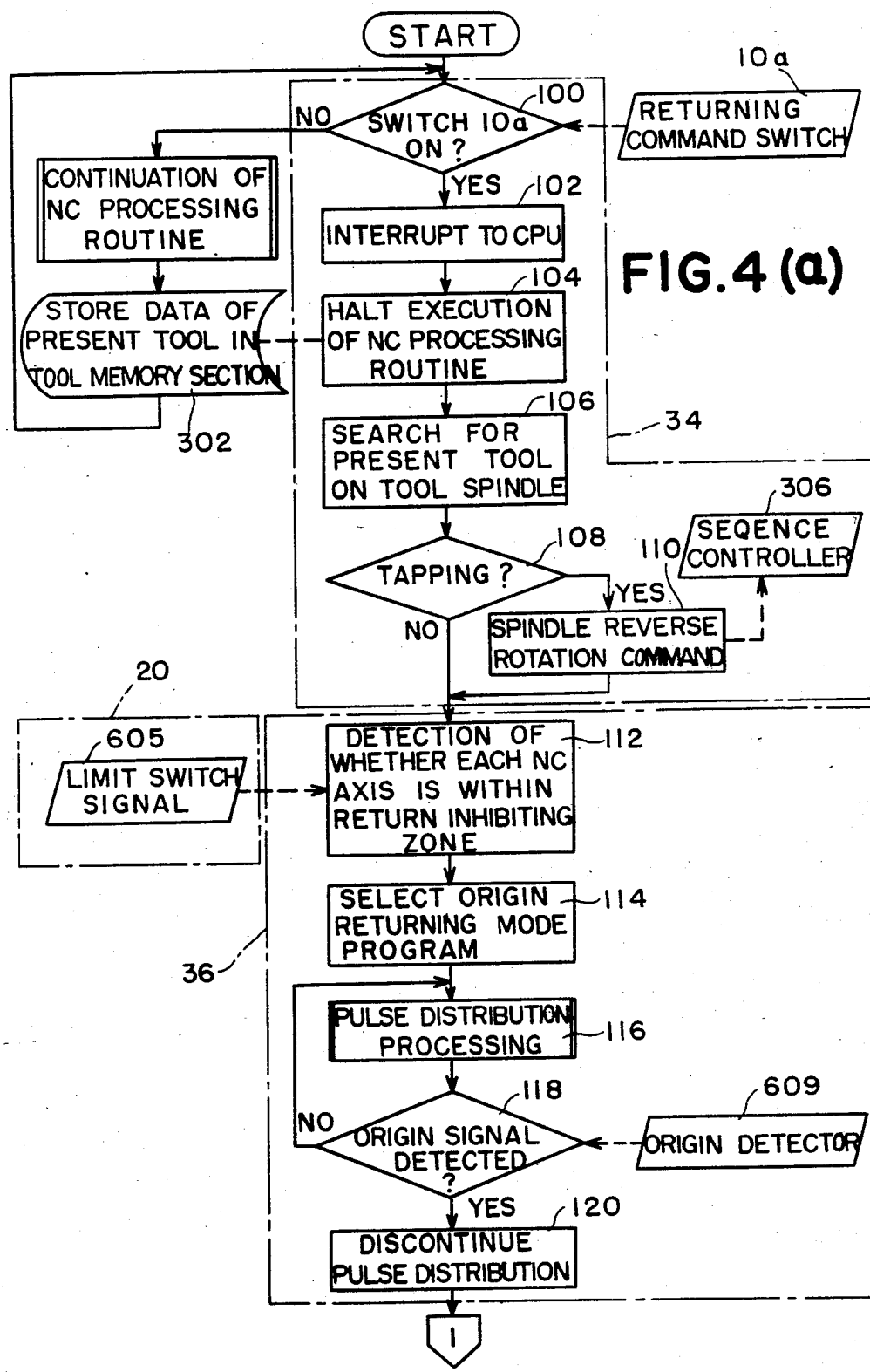

The apparatus according to the present invention is constructed as described above and is operable by providing the CPU 301 with a system control software as shown in FIGS. 4(a) and 4(b) in addition to other system control softwares (not shown) for conventional numerical control. When the emergency origin returning command switch 10a is depressed during the execution of the NC processing routine 40, the signal from the switch 10a is transmitted through the interface circuit 303 to the CPU 301 so as to apply an interrupt thereto. When receiving the interrupt in step 102, the CPU 301 discontinues the execution of the NC processing routine 40 and instead, executes an emergency origin returning routine shown in FIG. 4(a). The CPU 301 in step 106 makes a search for the kind of a tool being attached to the tool spindle 65. The NC processing routine 40 is programmed such that the kind of a tool being used in a current machining operation is stored in a predetermined address of the memory device 302 during the machining operation. Thus, the search is done by checking the data being stored in the predetermined address of the memory device 302 in step 106.

The tool attached to the tool spindle 65 includes a drilling tool, a tapping tool, a spot facing tool and the like. In the case of a tapping tool being attached to the tool spindle 65, the tool spindle 65 must be rotated in a reverse direction to disengage the tapping tool from a workpiece. Accordingly, when the tool being attached to the tool spindle 65 is confirmed to be a tapping tool in step 108, a signal instructing the reverse rotation of the tool spindle 65 is output in step 110. The sequence controller 306 responsive to the signal controls a spindle drive motor 621 to rotate the tool spindle 65 in the reverse direction.

It is ascertained in step 112 whether each of the NC drive axes has been stopped within the origin return inhibiting zone. This asertainment is made by detecting the ON-OFF state of the limit switch 605. For example, when each NC drive axis is out of the origin return inhibiting zone, a first origin returning mode is selected instructing that the NC drive axis be returned to its machine origin. However, when each NC drive axis is within the origin return inhibiting zone, a second origin returning mode is selected instructing that the NC drive axis be once brought out of the origin return inhibiting zone in a direction away from the machine origin and then be returned to its machine origin. In this manner, one of the first and second origin returning modes is selected for each of the NC drive axes in step 114. In step 116, feed pulses are distributed to each NC drive axis in a selected one of the first and second origin returning modes until the origin detection signal is generated from the origin detector 609. Consequently, when the pulse distributions are terminated in step 120, all of the NC drive axes are stopped at the respective machine origins.

The predetermined address of the memory device 302 is searched in step 122 for the kind of a tool being registered therein. Ascertainment is then made in step 124 as to whether the searched tool kind, i.e., a tool being presently used as identical to that which has been scheduled by the NC program to be used firstly. When they are not identical, tool exchange code data is output to the sequence controller 306 in step 126 so as to perform a tool exchange operation. Thus, the sequence controller 306 controls the tool magazine 602 and the tool exchanger 603 to set up on the tool spindle 65 the tool which has been scheduled by the NC program to be used firstly. The execution of the origin returning routine is completed by this tool exchange operation, whereby the NC machine tool 60a is set to the initial state ready for restarting.

Obviously, numerous modifications and variations are possible in light of the above teachings. It is therefore to be understood that within the scope of the appended claims, the present invention may be practiced otherwise than as specifically described herein.

What is claimed is:

1. A numerical control (NC) machine tool comprising:
   a frame;
   a spindle head rotatably carrying a tool spindle;
   a spindle drive motor drivingly connected to said tool spindle;
   a work table for mounting a workpiece thereon;
   an NC drive axis for effecting relative movement between said spindle head and said work table in an axial direction of said tool spindle;
   a tool magazine for storing a plurality of tools;
   a tool changer for selectively attaching said tools to said tool spindle;
   command means manually operable for generating a command signal instructing the returning of said NC drive axis to a machine origin;
   an origin detector for generating an origin signal when said NC drive axis is returned to said machine origin;
   a return inhibiting zone detector operable by the relative movement between said spindle head and said work table in the axial direction of said tool spindle for generating a return inhibiting signal when said NC drive axis is within a return inhibiting zone which is defined in the vicinity of said machine origin; and
   a numerical controller connected to said spindle drive motor, said NC drive axis, said tool changer, said command means, said origin detector and said return inhibiting zone detector and operable for controlling said NC drive axis and said tool changer in accordance with a numerical control program so as to perform a series of machinings on said workpiece, said numerical controller including,
   memory means for registering a tool being presently used on said tool spindle,
   origin returning control means responsive to said command signal from said command means for controlling said NC drive axis to discontinue advance movement and then to effect origin returning movement until said origin signal is output from said origin detector, wherein said origin returning movement is performed in such a manner that when said NC drive axis is within said return inhibiting zone upon the manual operation of said command means, said NC drive axis is moved first out of said return inhibiting zone in an opposite direction away from the machine origin and then is reversed toward said machine origin,
   direction decision means for determining the direction in which said tool spindle is to be rotated durig said origin returning movement of said NC drive axis under the control of said origin returning control means, by reference to said tool being registered in said memory means, and
   rotation control means for controlling said spindle drive motor to rotate said tool spindle in said direction determined by said direction means during said origin returning movement of said NC drive axis under the control of said origin returning control means.

2. A numerical control machine tool as set forth in claim 1, further comprising:
   tool set-up control means operable when said NC drive axis is returned to said machine origin under the control of said origin returning control means, for controlling said tool changer to set up on said tool spindle a tool which is scheduled by said numerical control program to be used firstly.

3. A numerical control machine tool as set forth in claim 2, wherein said NC drive axis includes:
   a DC servomotor for effecting relative movement between said spindle head and said work table in the axial direction of said tool spindle;
   a resolver drivingly connected to said DC sevomotor for outputting position and speed feedback signals;
   a differential counter responsive to command feed pulses applied from said numerical controller and said position feedback signal for calculating the difference therebetween; and
   a driver responsive to said difference from said differential counter and said speed feedback signal from said resolver for applying to said DC servomotor a DC voltage to equalize said speed feedback signal with said difference.

* * * * *